April 7, 1959  W. L. VIRDEN ET AL  2,880,598
FRESH FRUIT DISPENSER
Filed Jan. 17, 1956

INVENTORS.
William L. Virden
Richard B. Yankee
BY
ATTORNEY.

though usually sold for use in the home for keeping picnic foods, etc., cool. Refrigerant cans 33 are normally frozen before use and are used to keep the food surrounding the same cool for some considerable period of time. One can 33 is shown positioned within lower cylindrical channel 28a and it will be seen that the outer diameter thereof is essentially equal to the inner diameter of cylindrical channel 28a. Cylindrical channel 28a, as previously mentioned, rests on base plate 10 and thus, supports can 33 above pan 32 so that frost melting from can 33 will drop into pan 32. The entire central post is made up of cylindrical channels 28 and 28a which are resting each upon the other or upon base plate 10 as the case may be. Thus, this central post is made up of a plurality of cans 33 positioned in end to end relationship one above the other within the central post. The central post is open at its upper end and is closed by closure plate 34 which has a centrally downwardly extending boss 35 to engage the uppermost can 33 and a circumferentially downwardly extending flange 36 which rests upon the upper edge of the uppermost cylindrical channel 28. A handle 37 is fixed to the upper surface of closure plate 34. Closure plate 34, thus, completes the central post and seals the cans 33 therein.

FRESH FRUIT DISPENSER

William L. Virden, Kansas City, Mo., and Richard B. Yankee, Kansas City, Kans.

Application January 17, 1956, Serial No. 559,594

6 Claims. (Cl. 62—291)

This invention relates to fruit or perishable food dispensers and refers more particularly to such a dispenser which has self-contained refrigerating means independent of any electrical or other energy source, said refrigerant means periodically replaceable to maintain the proper food preserving temperature within the dispenser.

Previously, devices have been provided for dispensing fruit and like perishable food products wherein a plurality of shelves have been mounted on a hollow central post in which refrigerating means have been provided for preserving the food materials on the shelves. Such devices, however, have depended upon external electrical or other power sources for operating the refrigerating means or complicated and bulky internal refrigerator motors themselves yet dependent upon external power sources. Many objections to such devices exist including the cost of operating the mechanical or electrical refrigerating systems, the problem of repair and upkeep of such systems, the bulk and original cost of such refrigerating systems, the resultant bulk and immovability of the dispenser once it is mounted and connected to its power source, and the possibility of food spoilage should the refrigerating device or its power source fail.

Therefore, an object of the present invention is to provide a refrigerating dispenser for fresh fruit or other perishable food stuffs which has a central refrigerating system independent of any mechanical or electrical refrigerating mechanism or power source.

Another object of the invention is to provide a refrigerating food dispenser which has a self-contained refrigerating means as above described, said refrigerating means being renewable periodically with the servicing of the dispenser, the refrigerating means being sufficient to condition the foodstuff between servicing.

Another object of the invention is to provide a refrigerating fruit or foodstuff dispenser which is self-contained, easily movable and portable, very inexpensive compared to previous such devices, easily, speedily and conveniently serviced both as to the foodstuffs and the refrigerating means and of an extremely attractive appearance as a display device.

Another object of the invention is to provide a refrigerating dispenser for perishable foodstuffs wherein a much larger percentage of the volume thereof is devoted to foodstuff storage than has been provided in other devices of this type due to the provision of a novel means of refrigeration.

Other and further objects of the invention will appear in the course of the following description thereof.

In the drawings which form a part of the instant specification and are to be read in conjunction therewith, there is shown an embodiment of the invention and, in the various views, like numerals are employed to indicate like parts.

Figure 1:
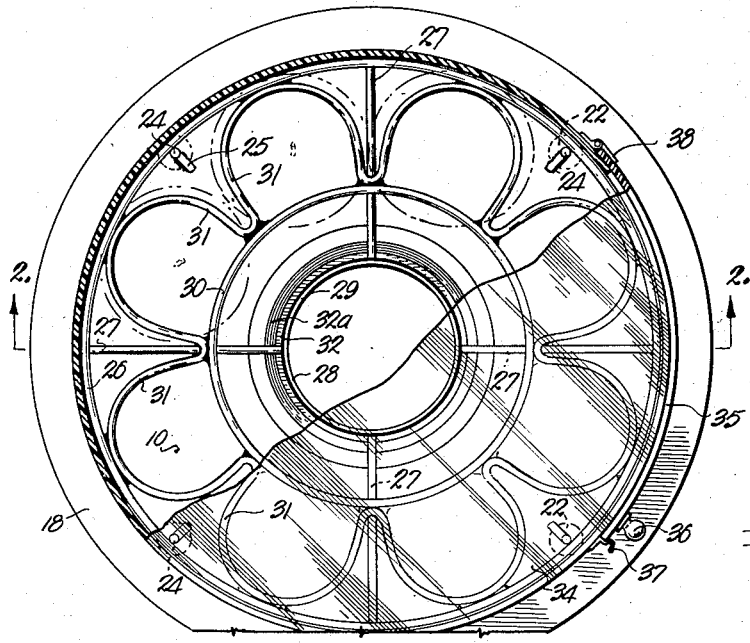
Fig. 1 is a plan view of the inventive perishable foodstuff refrigerating dispenser with parts cut away and parts in section to better illustrate the construction thereof.

Referring to the figures, the numeral 10 indicates a base plate having a circumferential end wall 11 and a bottom wall 12 affixed thereto. Base plate 10 is preferably circular in shape. A pad 13 of insulating material, such as Fiberglas mat or the like, is positioned between base plate 10 and bottom plate 12 to heat insulate the base plate and aid in the support thereof. Central threaded post 14 connects base plate 10 and bottom wall 12 and also serves to space them one from the other. Post 14 is received in openings 15 and 16 in the base plate and bottom plate respectively. Threaded opening 17 penetrates the post. Secondary base plate 18 is preferably of greater diameter than primary base plate 10 and is fixed thereto by bolt 19 having threaded portion 20 to engage the threaded opening in post. Shim 21 spaces the bottom plate 12 from the secondary base plate 18 and permits rotation of the base plate 10 and its superimposed attached unit relative thereto. Support studs or legs 22 are fixed to the bottom side of secondary base plate 18 and serve to space it away from any supporting surface 23.

A plurality of vertical support members 24 are mounted around the periphery of the primary base plate 10 and are welded thereto by feet 25. The preferred construction in the drawings shows four such support members 24 but more may be used if desired. A plurality of circumferential shelf rings 26 are welded or otherwise fixedly attached to vertical support members 24 to define a plurality of shelf levels within the space above the base plate. The rings 26 are equal to or less in diameter than the primary base plate 10. A plurality of inwardly extending arms 27 are fixed to the shelf rings 26. Cylindrical channels 28 are attached to the inmost ends of inwardly extending arms 27 and serve to define hollow center portions 29 of the shelf levels. Inner shelf rings 30 are fixed to the inwardly extending arms 27 circumferentially to the cylindrical channels 28. Between each inwardly extending arm are mounted a pair of wire loops 31 preferably formed from a single continuous wire strip. The loops 31 together with the inner ring 30 on each shelf level form a plurality of closed wire loops to support the foodstuffs or fruit to be dispensed. The closed loops formed by the loops 31 and inner ring 30 are preferably of lesser diameter than the objects or foods to be dispensed, thus to support the foodstuffs above the shelf level. It is also contemplated that a flat sheet (not shown) of metal may be fixed between the inner circumferential channels 28 and the outer rings 26 supported by the inwardly extending arms 27 to form the foodstuff supports. However, the wire construction just set forth is preferable in that circulation of cooling air is more complete with an open wire construction and positioning of the foodstuffs is more secure.

Figure 2:
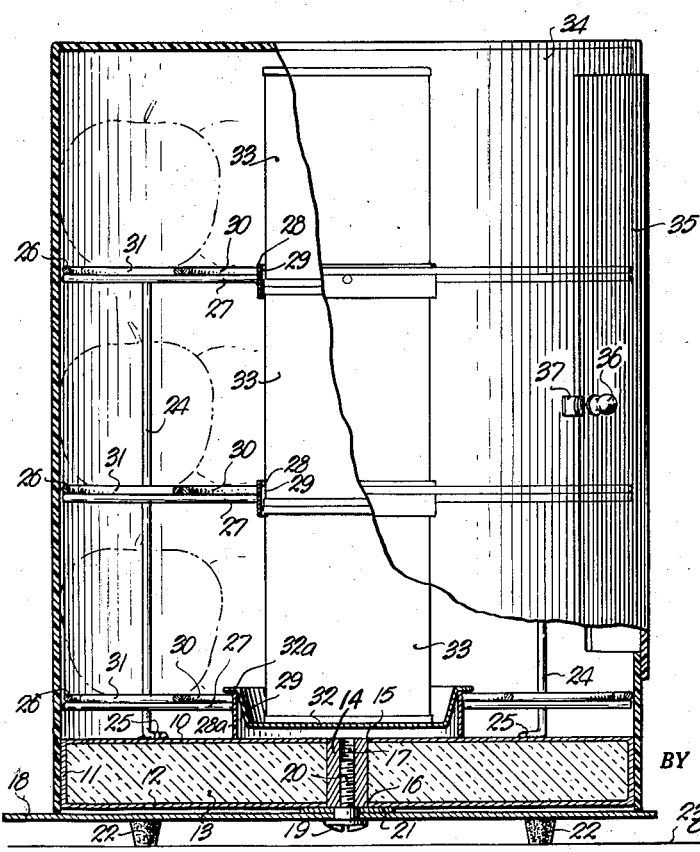
Fig. 2 is a perspective view of the inventive dispenser of Fig. 1 with parts cut away and parts in section also to better illustrate the construction of the device.

The lower shelf level preferably has a cylindrical channel 28a of greater internal diameter than the upper cylindrical channels 28. The cylindrical channel 28a in the lower shelf also preferably rests on the base plate 10. The purpose of the greater diameter of the lower cylindrical channel is to receive fluid receiving dish or pan 32, the fluid containing portion thereof having an outer diameter at its upper edge essentially equal to the internal diameter of the lower cylindrical channel 28a. Flange 32a on the dish or pan 32 is of greater diameter than the lower cylindrical channel 28a thus to rest on the upper edge thereof as shown in Fig. 2. The purpose of the liquid receiving dish or pan 32 is to receive the base of one of a plurality of cans 33 of refrigerant liquid. Cans 33 are filled with water or other suitable liquid refrigerant, this type of refrigerant means being presently commercially available on the market and not comprising by itself alone the novel feature of the invention. The distance between the shelves or shelf levels is preferably gauged so that a single can of refrigerant fluid will be spaced opposite each separate shelf level. The inner diameter of the cylindrical channels 28 is preferably just slightly greater than the outer diameter of the ends of the cans of refrigerant fluid. It is possible to have made or purchase cans of varying size filled with the refrigerant fluid and it is desirable to relate the sizes and heights of the hollow centers of the shelf levels and the shelf levels themselves with the sizes and heights of the cans to completely perform the invention. Preferably the ends of the cans 33 are positioned inside of the vertical cylindrical channel members 28 so that any tilting of the cans tends to be resisted by contact with the cylindrical channels 28. The cans are stacked one on top of the other with the base of the lower can being received in the liquid receiving pan or dish 32. The purpose of the pan is to receive condensation liquids from the can surfaces so there will be no drippage or staining on the base plate 10.

Cylindrical enclosure 34, preferably formed of transparent or translucent material such as Lucite, styrene or other plastic material, many of which are available on the market, glass itself being suitable if desired, serves to enclose the volume of the dispenser above the secondary base plate 18 so as to retain the chilled atmosphere therein produced by the cans of refrigerant material 33. The internal diameter of the enclosure 34 is preferably slightly greater than the outer diameter of the base plate 10 and the shelf rings 26, the enclosure 34 preferably resting on the secondary base plate 18. The primary base plate 10, its lower base assembly and the shelf levels are rotatable within the enclosure 34 by opening the door 35 therein, seizing a shelf ring 26 and rotating the whole internal assembly on shim 21 above plate 18. Thus, all of the fruit or food on the levels is available to the consumer through the door. Door 35 has handle 36 and attaching clip 37 fixed relative thereto on the enclosure 34 to permit enclosing in sealing fashion the entire food storing volume of the dispenser. Door 35 is mounted on the enclosure wall by hinge 38, best seen in Fig. 1. The height of the enclosure 34 above the secondary base plate 18 is greater than the height of the piled cans of refrigerant material so as to give sufficient clearance thereto.

To service the foodstuff dispenser, the operator need only to lift the plastic enclosure 34 upwardly until it clears the inner frame assembly and refrigerant cans 33 and set it aside. The cans 33 of refrigerant fluid may then be removed one by one from the stack and replaced with new freshly frozen cans. Old foodstuffs may be removed and new ones added or merely new foodstuffs added to fill the vacant spaces in the rack. When the refrigerant fluid cans are removed for replacement, the drip pan or dish 32 may be emptied and wiped clean and returned to receive the new cans. The entire food dispensing assembly is available for cleaning at this time if desired. The enclosure 34 itself may be washed or polished also if such is needed. The food racks having been replenished and the new refrigerant cans 33 positioned on the cleaned drip pan 32, the enclosure 34 is then again set on the secondary base plate 18 over the whole dispenser assembly. It is contemplated that the inventive foodstuff dispensers be serviced at 24-hour intervals and it has been determined by experiment that the cooling effect of the plurality of refrigerant cans, as previously described and shown in the drawings, is sufficient to properly condition fresh fruits and other foodstuffs so as to preserve them during this period. Due to the transparent enclosure 34 the insulation 13 of the primary base plate 10 and the spacing of the drip pan 32 from the base plate 10, there is prevented any excessive heat gain by the cans except through the circulation of the atmosphere within the enclosure. The spacing of the secondary base plate 18 from the table surface or other supporting surface 23 also aids in the insulation of the dispenser.

In operation, with freshly frozen cans of refrigerant fluid positioned in columnar form within the hollow central shelf portions and the racks filled with fresh food, the dispenser is preferably placed in a restaurant, bar or on any type of vending counter 23 available to the public. The door 35 is of such size and is so positioned that a consumer has access to any or all of the shelf levels. By opening the door, the consumer can reach inside the enclosure 34 and rotate the inner dispensing racks so as to reach any desired portion thereof. The transparent enclosure 34 permits close inspection of all the products for sale. The door 35 may be mounted with a spring (not shown) to return it to locked position so excess loss of the cooling atmosphere is avoided. The dispenser may be moved by the operator as desired as it is independent of any power source or electrical outlet. The shelf levels are, of course, independent of the central refrigerating column for their support, the vertical support members 24 carrying the entire weight of the shelves.

Thus, a refrigerated dispenser for fresh fruit or other perishable foodstuffs has been provided with a central refrigerating system independent of any mechanical or electrical refrigerating mechanism or power source.

Such a dispenser has been provided which is self-contained, easily movable and portable, relatively inexpensive, easily and conveniently serviced both as to the foodstuffs and the refrigerating means and which has an extremely attractive appearance as a counter display device.

The inventive dispenser also devotes a much larger percentage of its internal volume to foodstuff storage than has been previously employed in such refrigerated devices before due to the self-contained nonmechanical and non-power operated refrigerating means.

From the foregoing, it will be seen that this invention is one well adapted to obtain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter hereinabove set forth or shown in the accompanying drawing is to be interpreted as illustrative and not in a limiting sense.

We claim:

1. A refrigerating dispenser for fresh fruit comprising a base, a plurality of vertical support members mounted around the periphery of said base and entirely supported thereby, a plurality of shelf levels mounted above said base, said shelf levels having hollow centers and being attached to and entirely supported by the peripheral support members, a container of refrigerant fluid positioned centrally of said dispenser and penetrating at least one shelf level, the outer diameter of the refrigerant fluid container being less than the inner diameter of the hollow shelf center and a removable enclosure for the dispenser enclosing the volume thereof above the base having a doorway therein for access to the shelves, the lower shelf level having a hollow center of greater internal diameter than the hollow centers of the other shelf levels whereby to receive therein means for receiving liquid and supporting the refrigerant can whereby to receive therein any fluid condensation on the can.

2. A refrigerating dispenser as in claim 1 including a cylindrical vertical channel fixed to the hollow center of the shelf level and supported on the base whereby to position said liquid receiving and can supporting means away from the base whereby to provide insulating air space therebetween.

3. A refrigerating dispenser for fresh fruit comprising a base, a plurality of vertical support members mounted around the periphery of said base and entirely supported thereby, a plurality of shelf levels mounted above said base, said shelf levels having hollow centers and being attached to and entirely supported by the peripheral support members, a container of refrigerant fluid positioned centrally of said dispenser and penetrating at least one shelf level, the outer diameter of the refrigerant fluid container being less than the inner diameter of the hollow shelf center and a removable enclosure for the dispenser enclosing the volume thereof above the base having a doorway therein for access to the shelves, the shelf levels comprising a peripheral closed wire loop, a plurality of inwardly extending arms attached at their outer ends to said closed loop, a central vertical channel attached to the inner ends of said arms, and closed wire loops attached to the outer closed loop and the inwardly extending arms, the closed wire loops having an internal diameter less than the outer diameter of the goods to be dispensed, the closed outer loop being atached to the plurality of support arms whereby the shelf levels are entirely supported thereby.

4. A refrigerating dispenser for fresh fruit comprising a base, a plurality of vertical support members mounted around the periphery of said base and entirely supported thereby, a plurality of shelf levels mounted above said base, said shelf levels having hollow centers and being attached to and entirely supported by tthe peripheral support members, a plurality of containers of refrigerant fluid positioned centrally of said dispenser, the outer diameters of the refrigerant fluid containers being less than the inner diameters of the hollow shelf centers, the plurality of cans of refrigerant fluid stacked one on top of another to form a central refrigerant column, the heights of the cans of refrigerant fluid so proportioned relative the heights of the shelf levels above one another that the outer surface of each separate can is exposed to each separate shelf level, and a removable enclosure for the dispenser enclosing the volume thereof above the base having a doorway therein for access to the shelves.

5. A refrigerating dispenser for fresh fruit comprising a base, a plurality of vertical support members mounted around the periphery of said base and entirely supported thereby, a plurality of shelf levels mounted above said base, said shelf levels having hollow centers and being attached to and entirely supported by the peripheral support members, the shelf levels having vertical cylindrical channels mounted on the hollow centers thereof, a plurality of cans of refrigerant fluid mountable one upon the other, said cans positioned centrally of said dispenser, the outer diameter of the cans being less than the inner diameters of the vertical cylindrical channels, the heights of the cans being such as to position the ends of the cans within the cylindrical channels, the inside diameters of the cylindrical channels being close to the outside diameter of the can ends whereby the channels tend to support the cans if the cans are tilted in their position on the refrigerant column, and a removable enclosure for the dispenser enclosing the volume thereof above the base having a doorway therein for access to the shelves.

6. A refrigerating dispenser as in claim 3 wherein the closed wire loops attached to the outer closed loop and the inwardly extending arms are closed centrally short of the hollow centers of said shelf levels whereby to permit free circulation of air centrally and vertically relative the closed wire loops.

References Cited in the file of this patent

UNITED STATES PATENTS

| 109,663 | Price | Nov. 29, 1870 |
| 802,192 | Brown | Oct. 17, 1905 |
| 2,133,856 | Guthrie | Oct. 18, 1938 |